Feb. 19, 1952 — J. J. MALIN — 2,585,950
RANGE-HEIGHT INDICATOR
Filed March 6, 1943 — 3 Sheets-Sheet 1

INVENTOR
JOSEPH J. MALIN
BY William W. Hall
ATTORNEY

Patented Feb. 19, 1952

2,585,950

UNITED STATES PATENT OFFICE 2,585,950

RANGE-HEIGHT INDICATOR

Joseph J. Malin, Kulpmont, Pa.

Application March 6, 1943, Serial No. 478,192

8 Claims. (Cl. 343—112)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to object detection systems, and more particularly, to a method and means for determining the horizontal range and altitude of an object in space such as an aircraft.

In one form of existing systems for object detection, for example, the so-called pulse-echo system, means are provided for enabling the direct and continuous reading of azimuth, angular elevation, and slant range; but in order to apprise the operator of the horizontal range or of the altitude of the object under observation it is necessary to combine slant range and angular elevation in a converting device. This device is generally mechanical and it has been found to suffer from the usual defects of things mechanical, such as backlash, wear and tear, etc. As a result, after relatively short use the device becomes inaccurate and therefore useless for the purpose for which it was designed.

It is therefore an object of the present invention to eliminate this disadvantage and provide a more dependable means for determining horizontal range and altitude than has heretofore existed.

It is another object of the present invention to provide a method and means whereby the operator of the equipment has before him at all times direct and continuous information respecting the horizontal range and altitude of the object under observation.

The present invention attains these desirable results by first locating the azimuthal plane of the object and then scanning that plane to determine the angular elevation and slant range thereof. The position in space of the object thus determined is indicated, through a system of polar coordinates, upon an oscilloscope; and the indicated position is projected to calibrated fiducial lines displayed upon the oscilloscope screen whereby the observer is immediately advised of the horizontal range and the altitude of the object.

In the following specification there is described and in the annexed drawings shown a specific embodiment of the present invention, although it is to be clearly understood that said embodiment is merely illustrative and is not intended to limit the true spirit or scope hereof, which will be pointed out in the appended claims.

In said drawings.

Figure 1:
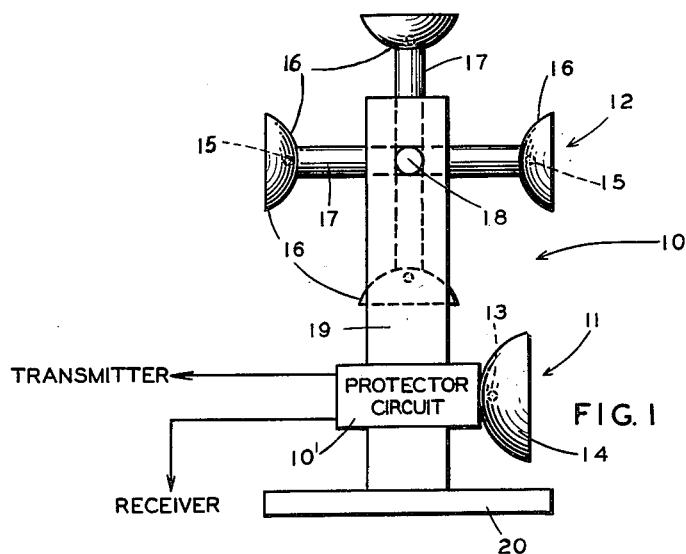
Figure 1 shows one form of radiating-receiving means which may be employed in the present invention.

Referring now more in detail to the aforesaid illustrative embodiment of the present invention, with particular reference to Figure 1 of the drawings, the numeral 10 generally designates a radiating-receiving means which includes an azimuth-determining directional antenna means 11 and a combined angular elevation and slant range-determining directional antenna means 12. As will hereinafter be more fully pointed out, the former is intended to be rotated or otherwise moved to scan a horizontal sector of space, preferably through 360°; and the latter is intended to be rotated, rocked or otherwise moved to scan a vertical sector of space, preferably 90° thereof, or a sector extending from directly overhead to the horizon.

The azimuth-determining directional antenna means 11 includes an antenna array 13 mounted within a parabolic reflector 14 of the wide-beam type, although any other appropriate means for directionally radiating high frequency energy into space may be employed in its place. The azimuth-determining directional antenna means is mounted on the uprights 19.

The angular elevation and slant range-determining directional antenna 12 includes at least one antenna array 15 mounted within a parabolic reflector 16 of the narrow beam type, although here again, any other appropriate means for directionally projecting radio waves may be substituted therefor.

In scanning the vertical sector of space, particularly if the sector is limited to 90°, it is desirable that there be no discontinuity in the scanning and therefore I prefer that angular elevation and slant range determining directional antenna means 12 be composed of four antenna arrays 15 and associated reflectors 16, disposed at right angles to each other. In such case, the reflectors 16 may be carried at the outer ends of cross arms 17 which extend from a shaft 18 rotatably mounted in suitable supporting members such as the uprights 19. Uprights 19 in turn are mounted upon a turntable 20 or any other means for rotation about a vertical axis. All of the antenna arrays are connected through suitable transmission lines to a transmitter adapted to generate pulses of high frequency energy at an audio frequency rate, and also to a radio receiver; the transmitter, receiver, and antenna arrays constituting a so-called pulse-echo system for object detection.

In such a system, pulses of high frequency energy are projected into space. Should this energy encounter an object such as an aircraft, a portion thereof is reflected or reradiated thereby. A portion of the reflected or reradiated energy, constituting an echo of the original transmission, is received back at the detecting station and may there be utilized for a variety of purposes, such as the determination of the angular elevation of the reflecting object, the slant range thereof, the object's location in azimuth, or, as in the present invention, the horizontal range and the altitude thereof.

It is sometimes desirable that a single antenna be employed for both transmission and reception and in order to protect the receiver from shock during the transmission, the connections to the antenna should be made through a protecting circuit. Inasmuch as I prefer to employ antenna arrays which are common to the transmitter and receiver, an appropriate protecting circuit of this type, designated by reference character 10' in Figure 1, is disposed between the radiating-receiving means and the transmitter and receiver.

Figure 2:
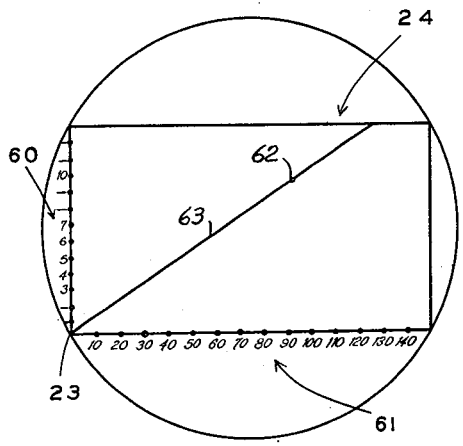
Figure 2 is an instantaneous view of the screen of an oscilloscope in the presence of an object detected by the present invention, and indicating the horizontal range and altitude of said object.
Figure 3:
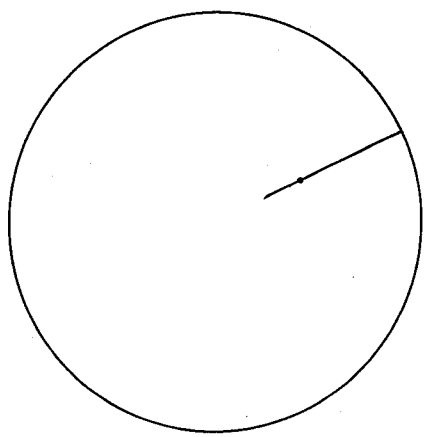
Figure 3 is an instantaneous view of the screen of another oscilloscope which may be used in the present invention for locating the object in azimuth.

In the present system, in order to indicate the presence of an object such as an aircraft and inform the observer of the accurate location in space thereof, I prefer to include two oscilloscopes of the panoramic type. Oscilloscopes of this type generally include means for generating a radial sweep and rotating the same about a predetermined point on the oscilloscope screen. The panoramic oscilloscope, the screen of which is shown in Figure 2 of the drawings, is preferably modified, as hereinafter set forth, for use as an indicator of the horizontal range and the altitude of the detected object and the other one, the screen of which is shown in Figure 3 of the drawings, may be entirely conventional and used for indicating the azimuthal plane which includes the detected object.

The azimuth-indicating oscilloscope is operated and read in the usual manner and is not thought to require a detailed explanation. Briefly, its mode of use is as follows: The radial sweep is synchronized with the pulse-transmission of the detection system and the sweep is rotated in synchronism with the rotation of the azimuth-determining directional antenna means 11 shown in Figure 1. The reflected energy received from an object such as an aircraft is applied to the intensity grid so that a bright spot will appear along the sweep trace to indicate the presence of the reflecting object. As is well known in pulse-echo systems, the space separating the commencement of the sweep and the position along the sweep of the bright spot is a function of the time of travel of the radio wave to the object and back to the detecting station and therefore is an indication of the range of the object. As is also well known, the angle formed by the sweep trace and a reference radius on the screen will indicate the azimuthal direction in which the reflecting object is located.

Figure 4:
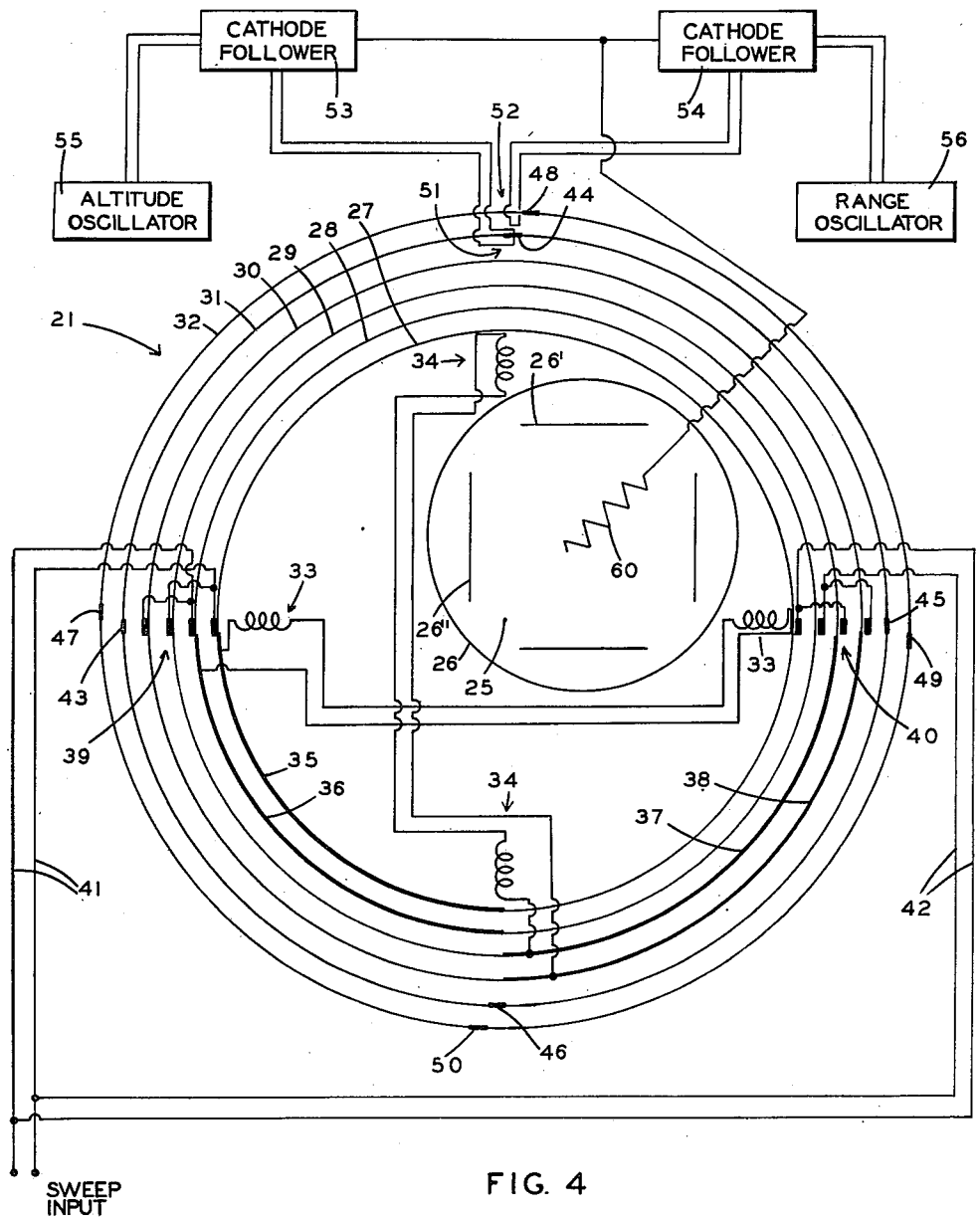
Figure 4 shows one form of a commutator assembly and associated circuits which may be used for controlling and calibrating the sweep of the oscilloscope referred to in the above description of Figure 2.

The horizontal range-altitude oscilloscope (Figure 2) may be of the electrostatic deflection type but in order to obtain a rotating radial sweep it preferably has associated therewith a commutator assembly, such as is shown in Figure 4 of the drawings, and there generally designated by the reference character 21. While the sweep of this oscilloscope may be pivoted about a point coinciding with the normal axis of the electron beam, this would, as will hereinafter be appreciated, limit the useful area of the oscilloscope screen and therefore I prefer, in the interest of clearer reading, to initially displace the beam so that it strikes the screen, as shown in Figure 2, in the lower left corner 23 of a rectangular section 24 thereof. Then, by pivoting the sweep about this corner a much greater area of the screen is available for display purposes. This displacement may be accomplished by applying suitable D. C. potentials to the vertical and horizontal plates 26' and 26" (Figure 4) of the oscilloscope.

In Figure 4, the point corresponding to the corner 23 of the rectangular section 24 is designated by the reference character 25. In order to rotate the sweep of the oscilloscope about this point, the commutator assembly 21 is mounted for rotation about the neck 26 of the cathode ray tube of the oscilloscope on an axis coinciding with the point 25, offset with respect to the normal axis of the electron beam of the tube. The assembly is preferably rotatable clockwise, in synchronism with the rotation or other appropriate movement of the angular elevation and slant range-determining means 12 of the radiating-receiving means 10 shown in Figure 1.

While not limited thereto, the commutator assembly here shown includes six concentric insulator rings 27-32 inclusive. The inner one, 27, is designed to carry two pairs of perpendicularly disposed deflecting coils, 33 and 34, each pair being series connected. The two inner rings 27 and 28 are provided with conducting quadrants 35 and 36 and the two intermediate rings 29 and 30 are likewise provided with conducting quadrants 37 and 38, the latter being displaced preferably 90° with respect to the former. The deflecting coils 33 are series connected with the conducting quadrants 35 and 36 and the deflecting coils 34 are series connected with the conducting quadrants 37 and 38.

In order to energize the coils 33 and 34, there is provided, adjacent the four inner rings 27-30 inclusive, in wiping contact therewith, and arranged 180° apart, two sets of contacts 39 and 40, each set including four contacts. Adjacent pairs of the set of contacts 39 are connected through conductors 41 to a conventional oscilloscope sweep circuit synchronized with the pulse transmission of the system, and adjacent pairs of the set of contacts 40 are likewise connected, through conductors 42 to the same sweep circuit. However, in order always to maintain the same direction of current flow through the coils 33 and 34, the conductors 41 and 42 should be connected to the oscilloscope sweep circuit in opposite phase relationship.

By means of this arrangement the pairs of deflecting coils 33 and 34 may be alternately energized every quarter revolution of the commutator assembly 21 so as to rotate the oscilloscope sweep about the point 25, corresponding to the corner 23 of the rectangular section 24 of the oscilloscope screen shown in Figure 2, in synchronism with the vertical scanning of the angular elevation and slant range-determining means 12 of Figure 1.

In order to enable an observer to translate the display on the oscilloscope screen of Figure 2 into terms of horizontal range or altitude, or both, I prefer to impress upon the screen at least one fiducial line composed of calibration markers coinciding with one or more of the sides of the rectangular section 24; and while not limited thereto, this may be accomplished as follows:

The next to the outermost ring 31 of the commutator assembly 21 is provided with four small bridging conductors 43–46 inclusive spaced 90° with respect to each other, and the outermost ring 32 is also provided with four small bridging conductors 47–50 inclusive spaced 90° with respect to each other, the latter being disposed slightly in advance of the former.

In wiping engagement with the outer and next to the outer rings 32 and 31 there are pairs of contacts 51 and 52. The pairs of contacts 51 and 52 are respectively connected to cathode follower stages 53 and 54 for respectively controlling the outputs of oscillators 55 and 56.

The oscillators may be similar to each other except for frequency of oscillation. One of them, hereinafter referred to as the altitude-oscillator 55, is designed to deliver narrow flat-topped pulses of a suitable frequency for calibrating the oscilloscope sweep trace in convenient altitude units and the other, hereinafter referred to as the range-oscillator 56, is designed to deliver similar pulses of a suitable frequency for calibrating the oscilloscope sweep trace in convenient range units. Both oscillators are preferably synchronized with the pulse transmission of the system.

Figure 5:
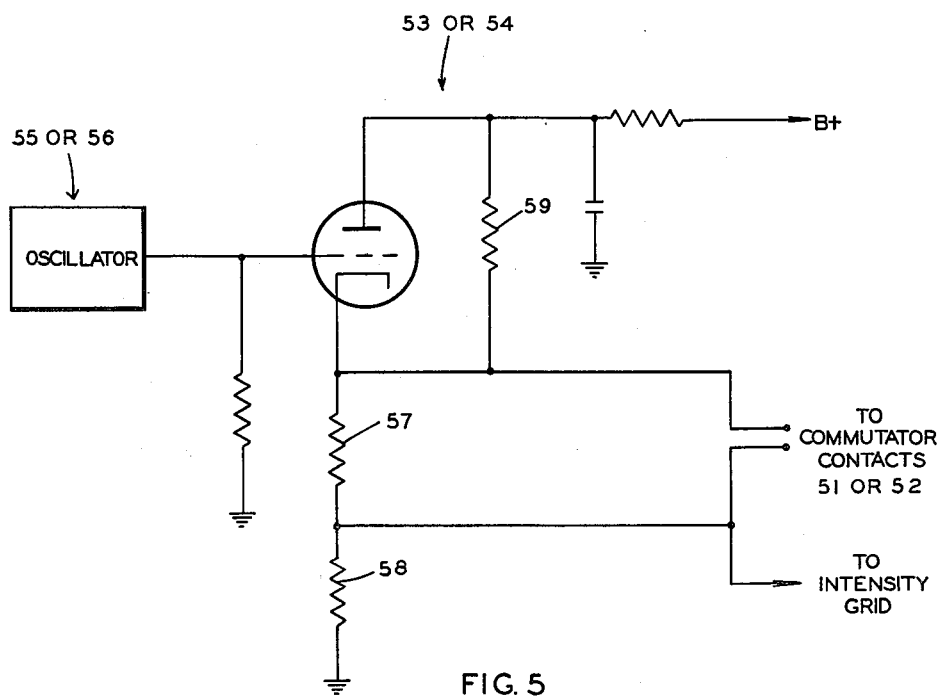
Figure 5 is a schematic diagram of one form of the controlling and calibrating circuit applicable to said commutator assembly.

One form of circuit which may be employed in the cathode follower stages is shown in Figure 5. The tube of each stage has a pair of resistors 57 and 58 connected in series with the cathode thereof, the resistors 57 of each stage being bridged respectively by the contacts 51 and 52. The plate and cathode of each stage is connected through a resistor 59. Therefore, when the circuits through the contacts 51 and 52 are open, the B supply flows through the resistors 57, 58 and 59 in each stage to bias the tube thereof beyond cutoff. The oscillations fed thereto are therefore prevented from reaching the intensity grid 60 (Figure 4) of the oscilloscope to which each cathode follower stage is connected. When however, the contacts 51 or 52 are bridged, the resistor 57 of the corresponding cathode follower stage is short circuited to reduce the bias on the tube thereof to a point where said tube will conduct, thereby conveying the output of the associated oscillator to the grid of the oscilloscope.

This completes the description of the aforesaid illustrative embodiment of the present invention and the operation of the system as a whole may be summarized as follows: The radiating-receiving means 10, shown in Figure 1, is rotated about a vertical axis at a convenient scanning rate so that the energized azimuth-determining means 11 scans horizontally, preferably through 360°. At the same time, the angular elevation and slant range-determining means 12 may be rotated about a horizontal axis so that, when subsequently energized, it will scan in a vertical plane.

When the screen of the azimuth oscilloscope, shown in Figure 3, indicates the presence of a target as hereinbefore explained, the rotation of the azimuth-determining means 11 is slowed down and then made to sweep back and forth over a small sector within which is included the azimuthal plane of the object detected. At this time the angular elevation and slant range-determining means 12 is energized to scan a vertical sector of space, preferably a quadrant extending from directly overhead to the horizontal, and the azimuth-determining means 11 is caused to cease functioning.

As previously stated, the commutator assembly 21 is preferably rotated in a clockwise direction in synchronism with the rotation of the angular elevation and slant range-determining means 12. When, as shown in Figure 4, the two innermost of the contacts 39 are just engaged by the conducting quadrants 35 and 36, the deflecting coils 33 will be energized so as to deflect the electron beam at right angles to the field. At the same instant that the electron beam is deflected vertically upward, the contacts 51 will engage the bridging conductor 44 to reduce the bias on the tube of the cathode follower stage 53 associated with the altitude-oscillator 55, so that the electron beam of the cathode ray tube will be modulated at the frequency of the oscillator, and a fiducial line, composed of vertically disposed calibration markers of suitable distance units, will appear on the screen, as shown at 60 in Figure 2. As the commutator assembly 21 rotates, the sweep will likewise rotate until it becomes horizontally disposed. At that instant the conducting quadrants 35 and 36 will become disengaged from the two innermost of the contacts 39, the coils 33 will no longer be energized, and the conducting quadrants 37 and 38, associated with the pair of deflecting coils 34 will engage the two outermost of the contacts 39. Inasmuch as this second pair of deflecting coils will have now reached a horizontal position the electron beam of the cathode ray tube will again be deflected upwardly. However, just before the conducting quadrants 37 and 38 became disengaged from the contacts 40, the bridging conductor 48 connected the contacts 52 with each other, thereby reducing the bias on the tube of the cathode follower stage 54 associated with the range-oscillator 56, so that while the sweep was in a horizontal position the electron beam was also modulated, and a fiducial line composed of markers 61 of suitable distance units corresponding to range appeared on the oscilloscope screen.

As the system continues to function the cycle of operations described will be repeated over and over again. The sweep will be rotated through an angle of 90° about point 23. When a visible spot, indicated at 62 (Figure 2), and corresponding to an echo from some object, appears on the screen, due to the intensity modulation of the electron beam by said echo, the slant range and angular elevation therefore will be made known through a system of polar coordinates. The radius vector 63, extending from the corner 23 on the screen to the spot itself, and the fiducial line 61 indicating the angular elevation, represents the direction of the sweep at the instant said echo is received. The angle formed by the radius vector 63 and the magnitude of said radius vector indicating the slant range. Horizontal and vertical projections of the echo spot 62 to the calibrated fiducial lines 60 and 61, which lines constitute rectangular coordinates intersecting at the origin 23 of the aforementioned radius vector, will immediately inform the observer of the altitude and the horizontal range of the object.

In other words, $$\text{Horizontal range} = r \cos \theta$$

where $r$ equals the magnitude of the radius vector extending from the point 23 to the echo spot 62, and $\theta$ equals the angle formed by the radius vector and the fiducial line 61;

And $$\text{Altitude} = r \sin \theta$$

where $r$ and $\theta$ have the same values as indicated above in connection with the equation for the horizontal range.

For example, reference to Figure 2 indicates that the object causing the echo is about 95 distance units away in a horizontal plane and is at an altitude of a little under 10,000 distance units.

It will be noted from all of the foregoing that there has thus been provided a method and means for immediately informing an observer of the accurate location in space of an object detected by a pulse-echo system for object detection. It will also be noted that by the means of the present invention mechanical moving parts are eliminated, thereby avoiding inaccuracies present in existing devices for supplying similar information.

While the specific embodiment described is designed to supply both horizontal range and altitude, if desired, the device can be used for either one by merely eliminating the appropriate conductors 43—46, 47—50; contact 51, 52; cathode follower stage 53, 54; and oscillator 55, 56.

Furthermore, while an illustrative embodiment of the present invention has been described in detail herein, as previously stated, it is to be clearly understood that the present invention is not limited to such details, inasmuch as changes may be made therein without departing from the spirit and scope of the claims hereto appended.

I claim:

1. In a system for object detection, means for determining the horizontal range and/or the altitude of an object with respect to a known site comprising, a cathode ray tube, means for radially sweeping the electron beam of said tube and rotating the resulting sweep about a given point on the screen of said tube, means for confining the rotation of said sweep to a given sector of the screen of said tube, means for generating calibration markers for impression upon said sweep, and means to confine the period of operation of said marker-generating means to coincidence between said rotating sweep and at least one of the limits of said sector.

2. In a system for object detection, means for determining horizontal range and/or the altitude of an object with respect to a known site comprising, a cathode ray tube, means for radially sweeping the electron beam of said tube and rotating the resulting sweep about a given point on the screen of said tube, means for generating calibration markers for impression upon said sweep, and a commutator assembly for confining the rotation of said sweep to a given sector of the screen of said tube and for causing the operation of said marker-generating means only during coincidence between said rotating sweep and at least one of the limits of said sector.

3. In a system for object detection, means for determining the horizontal range and/or the altitude of an object with respect to a known site comprising, a cathode ray tube, means for linearly sweeping the electron beam of said tube and rotating the resulting sweep about a given point on the screen of said tube, means for confining the rotation of said sweep to a given sector of the screen of said tube, means coupled to said tube for generating calibration markers thereon and means for rendering said markers visible during the operation of said tube only when said rotating sweep coincides with at least one of the limits of said sector.

4. In a system for object detection, means for determining the horizontal range and/or the altitude of an object with respect to a known site comprising, a cathode ray tube, means coupled to said tube for generating calibration markers thereon, visible only during operation of said tube, said calibration markers comprising a system of rectangular coordinates calibrated in units of horizontal range and altitude, means for determining the elevation and slant range of said object with respect to said known site, said last named means comprising means for linearly sweeping the electron beam of said tube and rotating the resulting sweep about the point of origin of the system of rectangular coordinates aforesaid.

5. In a system for object detection, means for determining the horizontal range and/or the altitude of an object with respect to a known site comprising, means for locating the vertical plane determined by the line connecting both said object and said site, a cathode ray tube, means for displaying upon said tube a representation of the location of the objects in said plane according to a system of polar coordinates, said last named means including means for linearly sweeping the electron beam of said tube and rotating the resulting sweep about a point on the screen of said tube, said point being the point of origin of the system of polar coordinates, means for generating calibration markers for impression upon said sweep and means to confine the period of operation of said marker-generating means so that it forms the abscissa and ordinate of a system of rectangular coordinates having the same point of origin as the system of polar coordinates aforesaid.

6. In a system for object detection, means for determining the horizontal range and/or the altitude of an object with respect to a known site comprising, a cathode ray tube, means for linearly sweeping the electron beam of said tube, means for rotating the resulting sweep about a given point on the screen of said tube, means for generating at least one calibration marker signal, normally ineffective means for impressing said marker signal on said tube to produce calibration markers on the screen thereof, and means coupled to said last-named means for rendering said last-named means effective only when said sweep is pointing in a predetermined direction.

7. In a system for object detection, means for determining the horizontal range and/or the altitude of an object with respect to a known site comprising, a cathode ray tube, means for linearly sweeping the electron beam of said tube, means for rotating the resultant sweep about a given point on the screen of said tube, means for generating a first and a second calibration marker signal, normally ineffective means for individually impressing said first or second signal on said tube to produce calibration markers on the screen thereof, and means coupled to said last-named means for rendering said last-named means effective to impress said first signal on said tube only when said sweep is pointing in a predetermined direction and to impress said second signal on said tube only when said sweep is 90° displaced relative to said predetermined direction.

8. An apparatus for providing a two coordinate display comprising a cathode ray tube having a fluorescent screen, means for sweeping the electron beam of said tube along a first coordinate, means for moving the resulting sweep along a second coordinate, means for generating at least one calibration marker signal, normally ineffective means for impressing said marker signal on said beam to produce calibration markers on said screen, and means coupled to said last-named means for rendering said last-named means effective only when said resulting sweep is at a predetermined position along said second coordinate.

JOSEPH J. MALIN.

REFERENCES CITED

The following references are of record in the file of this patent:

UNITED STATES PATENTS

| Number | Name | Date |
|---|---|---|
| 2,231,929 | Lyman | Feb. 18, 1941 |
| 2,272,607 | Higonnet | Feb. 10, 1942 |
| 2,395,966 | Goldberg | Mar. 5, 1946 |
| 2,426,189 | Espenschied | Aug. 26, 1947 |
| 2,432,196 | Hershberger | Dec. 9, 1947 |

FOREIGN PATENTS

| Number | Country | Date |
|---|---|---|
| 104,141 | Australia | June 2, 1938 |
| 543,638 | Great Britain | Mar. 5, 1942 |